United States Patent [19]
Hausler et al.

[11] Patent Number: 5,198,283
[45] Date of Patent: Mar. 30, 1993

[54] BACKLIT BUTTON BY THERMOFORMED CAP PROCESS

[75] Inventors: Ralph A. Hausler, Plymouth, Wis.; Lawrence Share, Skokie; Ghazi Khattab, Glenview, both of Ill.

[73] Assignee: Illinois Tool Works Inc., Glenview, Ill.

[21] Appl. No.: 802,390

[22] Filed: Dec. 4, 1991

Related U.S. Application Data

[62] Division of Ser. No. 496,524, Mar. 19, 1990, Pat. No. 5,098,633.

[51] Int. Cl.⁵ .............................................. B32B 3/00
[52] U.S. Cl. .................................. 428/195; 200/310; 200/312; 200/314
[58] Field of Search .................. 200/310, 312, 314; 428/195

[56] References Cited

U.S. PATENT DOCUMENTS

| | | |
|---|---|---|
| 3,604,878 | 9/1971 | Amis, Jr. .............................. 200/310 |
| 4,370,532 | 1/1983 | Green .................................... 200/314 |
| 4,778,966 | 10/1988 | Obata .................................... 200/310 |

Primary Examiner—Patrick J. Ryan
Assistant Examiner—Elizabeth Evans
Attorney, Agent, or Firm—Schwartz & Weinrieb

[57] ABSTRACT

A method is provided for fabricating resin-filled components, which comprises a multi-element arrangement of a thermoformed plastic sheet with a "second-surface" screen-printed graphic, which formed sheet can receive a light-directing apparatus, and the molded-resin is applied so as to secure the apparatus and provide stability to the overall structure or component. The method is particularly adapted with respect to the fabrication of graphic-display illuminated buttons for use within automotive vehicles.

28 Claims, 1 Drawing Sheet

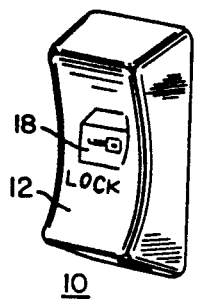
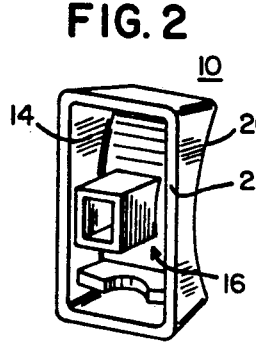
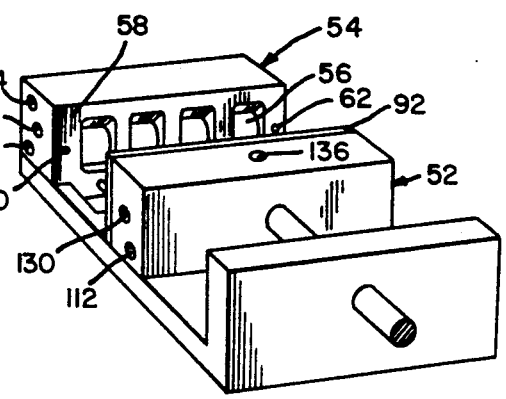
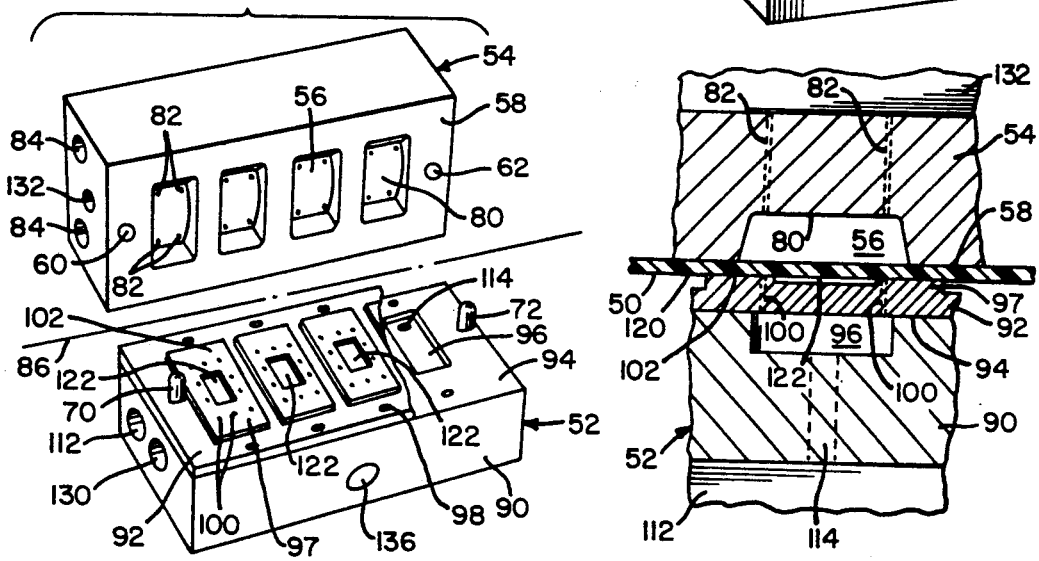
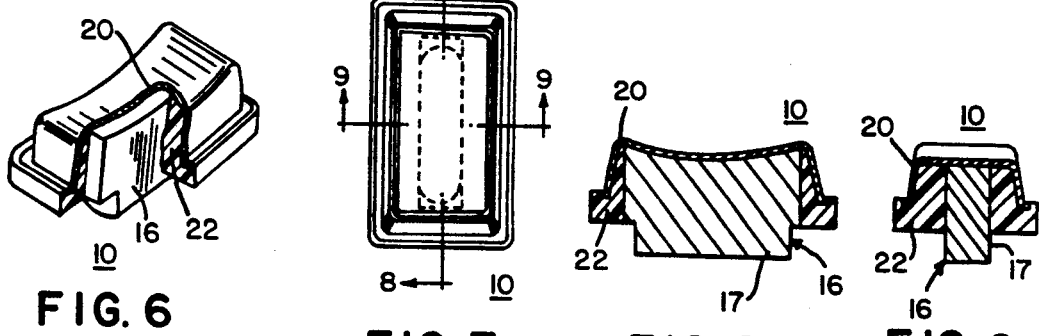

BACKLIT BUTTON BY THERMOFORMED CAP PROCESS

This application is a division of application Ser. No. 496,524, filed Mar. 19, 1990, now U.S. Pat. No. 5,098,633,

FIELD OF THE INVENTION

The present invention relates to a method for fabricating a resin-filled, thermoformed plastic cap. More particularly, a plastic sheet with a screen-printed graphic thereon is thermoformed and thereafter resin-filled so as to provide a finished structure, such as, for example, a button. These buttons find particular application upon or within control panels and dashboards for automobile vehicles and other apparatus.

BACKGROUND OF THE INVENTION

Backlit buttons are presently produced by pressure-forming a plastic material. The button surfaces are painted, screen-printed or otherwise marked with a design or label for indicating the particular function or apparatus associated with the button. The pressure-formed buttons have retained or residual mechanical stresses within the formed part thereof, which stresses subsequently induce fracture within the button rendering the button inoperable or aesthetically unacceptable. Pressure forming of the screen-printed surfaces also frequently induces ink adherence problems such as, for example, the development of pinholes, fractures and peeling, as the ink and underlying substrate are simultaneously stretched. An overlaid or painted symbol is susceptible to wear and erasure, which, obviously is also an undesirable side effect.

A thermoformed or molded button may be painted and subsequently marked with a laser-forming technique, however, the depth of the part is limited and the laser imprinting process may lead to wear of the symbol. The laser process may also be beset with problems of inconsistency and is economically unproven.

SUMMARY OF THE INVENTION

The present invention relates to a cap thermoformed from a plastic sheet material, which cap is subsequently resin-filled so as to provide a rigid and stable structure. The process of the illustrated embodiment utilizes a screen-printed plastic or thermoformable sheet with a second surface coating to protect the imprinted sign or label against abrasion upon wear on the label surface. Thereafter, the resin molding is injected into the formed cap or button so as to provide the back surface and wall thickness to the finished part. In a particular application, a light-pipe is inserted within the cap prior to injection molding and secured therein by means of the molding resin.

The process and apparatus traps the sheet at a predetermined position within the die; elevates the previously screen-printed sheet to an operating temperature; maintains a temperature differential across the sheet; maintains a desired pressure differential across the sheet cross-section; and allows the formed cap to cool to a stripping temperature within the mold so as to minimize retained or residual thermal stresses. Thereafter, the formed sheet is displaced from the mold and a light-pipe may be inserted prior to injection molding of the resin which injected molded resin provides stability and support for the formed plastic sheet as well as securing the light-pipe in position beneath the screened graphic.

BRIEF DESCRIPTION OF THE DRAWINGS

Various other objects, features, and attendant advantages of the present invention will become more apparent from the following detailed description, when considered in connection with the accompanying drawings, in which like reference characters designate like or corresponding parts throughout the several views, and wherein:

FIG. 1 is a front perspective view of a thermoformed cap and button assembly formed in accordance with the present invention;

FIG. 2 is a rear perspective view of the thermoformed button in FIG. 1;

FIG. 3 is a perspective view of a die set for thermoforming a plastic sheet;

FIG. 4 is an exploded view with a partial cutaway of the die set in FIG. 3;

FIG. 5 is a cross-sectional view of a coupled manifold and female die section with a material sheet for thermoforming therebetween;

FIG. 6 is a perspective view in partial section of a thermoformed button cap and resin-filled button;

FIG. 7 is a top plan view of the thermoformed button in FIG. 6;

FIG. 8 is a sectional view taken along line 8—8 of FIG. 7; and,

FIG. 9 is a cross-sectional view of the button in FIG. 7 taken along the line 9—9.

DETAILED DESCRIPTION OF THE PREFERRED EMBODIMENT

Thermoformed button 10 is illustrated in FIGS. 1 and 2 with a graphic display 18 visible through top surface 12, and has a generally cup-shaped cavity 14. The structure of button 10 finds utilization within automobile instrument panels, and, as seen in FIG. 2, has light-pipe 16 positioned within cavity 14 so as to focus and transmit light to imprinted graphic display 18, which light-pipe and light provide illumination for the graphic display. Multicomponent button 10 has thermoformed plastic cap 20 overlaid upon injection-molded wall 22, which provides rigidity and stability to the thermoformed cap and also secures light-pipe 16 within cavity 14.

Thermoformed cap 20 for button 10 or other application can be formed so as to conform to the contours of a desired shape, however, the formation of such a button is limited by operating parameters, especially the draw ratio. The particular shape and form of button 10 is illustrative only and exemplifies a known structure and use for such buttons. The draw ratio is the relationship defined between the length and depth of the part being formed or drawn. Button 10 in FIG. 6 is shown in partial section with thermoformed cap 20 and molded resin insert 22 bonded about light-pipe 16. The multiple contours of button 10 and the several surfaces as well as its relative length are illustrated in FIG. 7, and it can be appreciated that cap 10, more particularly, its shape, has a complex configuration. Similarly, the cross-sectional views in FIGS. 8 and 9 illustrate the relative position for light-pipe 16 and molded resin 22 beneath thermoformed cap 20.

In the preferred embodiment, cap 20 is thermoformed by means of a process utilizing a screen-printed plastic sheet, which is a polyester-polycarbonate alloy. The alloy sheet is provided with a lithographed symbol produced by the screen-printed process, using a multi-layered and cross-linked ink compatible with the sheet material. In FIGS. 3-5, sheet 50 is adapted to be formed between heater block-air manifold 52 and female die segment 54, which female segment 54 includes a plurality of recessed cavities 56 below surface 58. More particularly, female die segment 54 at surface 58 has four juxtaposed cavities 56, shown in the Figures, and locating apertures or bores 60 and 62, which are operable to receive mating locating pins 70 and 72 of manifold 52. Surface 58 is generally flat and parallel to transverse axis 86 as are vacuum passage 132 and, first and second fluid ducts 84 in female member 54. Each of cavities 56 is provided with a lower face 80, and a plurality of ports 82 at the several corners of cavities 56 communicating with vacuum passage 132 through female member 54. Passages 84, which are generally parallel to vacuum ducts 132 in female member 54, provide communication for transfer of cooling fluid for member 54.

In FIG. 4, manifold 52 comprises lower block 90 and facial insert 92, which is mounted upon upper surface 94 of block 90. Block 90 includes a plurality of recesses 96 within face 94, which are generally aligned with cavities 56 of female member 54 as a result of the latter mating with manifold 52. Locating pins 70 and 72 protrude or extend from upper face 94 for engagement with locating apertures 60 and 62, respectively, within female member 54.

Upper or face plate 92, in the preferred embodiment has a nonstick coating, such as, for example, TEFLON, and includes a plurality of raised members or sections 97, which in the illustrated embodiment have generally rectangular shapes and are positionable over cavities 56 upon mating engagement of male and female mold members 52, 54. Plate 92 is mountable upon upper surface 94 of block 90 and is secured thereto by means of a plurality of screws or bolts 98. Raised members 97 each have a plurality of passages 100, which extend from upper surface 102 of each raised member 97 to the cavity or recess 96 therebelow defined within face 94. These passages 100 are arranged in a pattern for open communication to recesses 96 within block 90 and, furthermore, are aligned above each one of the cavities 56 defined within female block 54. Block 90 includes an air passage 112 parallel to transverse axis 86 in FIG. 4, and extending through block 90 beneath cavities or recesses 96. Second parallel passage 130 within block 90 is both parallel to air passage 112 and transverse axis 86, and provides an opening for heat transfer fluid or other heat source so as to elevate the temperature of block 90 for heating sheet 50 to an operating temperature. Each one of the recesses 96 defined within face 90 is provided with a through-bore 114 communicating between recess 96 and air passage 112 for permitting the flow of air or other gas at an elevated pressure into recess 96 and passages 100 within face plate 92 so as to apply an elevated pressure to the back face 120 of sheet 50.

In the preferred embodiment, face plate 92 and, more specifically, raised members 97, are each provided with a centrally positioned depression 122 generally bounded by means of passages 100. The depression is generally aligned with the graphic display formed upon sheet back surface 120, and is approximately 10 mils below the male-member surface 102. Depression 122 avoids intimate heat contact with sheet 50 and thus heat insulates graphic symbol 18 so as to prevent variation of the ink upon the sheet.

The insulating nature of depression 122 establishes a temperature differential across surface 120 of sheet 50. The reduced temperature of sheet 50 within the vicinity of graphic symbol 18, which may be approximately 250° F. to 335° F., avoids symbol distortion during heating and forming of sheet 50 into cap 20.

Within the die set, the manifold 52 and female member 54 each have heating and/or cooling passages. Within manifold 52, passage 130 is parallel to air passage 112 and transverse axis 86 and within female member 54 central vacuum passage 132 is parallel to cooling fluid passages 84, which communicate cooling water to the interior portion of member 54 so as to maintain the proper temperature of die member 54. The choice of the type of heating or cooling fluid or method is determined by means of the operator and/or designer of the tools and equipment and does not detract from the performance of either the die or the thermoformed sheet.

The sheet material for thermoforming cap 20 for button 10, or any other specific application, should have properties consistent with thermoforming operations. Button 10 was formed so as to provide a character identification symbol that would be relatively impervious to erasure or erosion from external sources, thereby providing a sustained service life for the symbol. Furthermore, button 10 should not have residual or retained mechanical or thermal stresses, which lead to potential embrittlement, fracture or combinations of other mechanical failures. In addition, cap 20 must be compatible with any mating or overlaid material molded into its preform. The exemplary thermoformed button of the present invention utilized a polycarbonate polyester alloy sheet, which had been screen-printed with a graphic display in an ordered array for forming multiple buttons in a single operation. The sheet material of thermoformable material was screen-printed with a cross-linked ink, which provides a visible graphic symbol for a function associated with button 10. These overlaid or screen-printed graphics are provided in multiple layers, which process is familiar to the lithographer, and the cross-link inks utilized have inherent characteristics and properties that lend themselves to continuity and formation with the polyester polycarbonate materials, thereby avoiding separation, pitting and pinholing. Furthermore, the intimate contact between the inks with the cross-link agents and the sheet provide thermal stability to the inks during the forming operation. The screen-printed sheets are also provided with locating ports or points, which are utilized to properly locate the printed graphic symbols within the die set 52, 54 prior to the thermoforming operation. In the Figures, locating holes along the sidewall of the printed sheet are matable with locating pins 70, 72 upon manifold 52 so as to secure the screen-printed graphic and plastic sheet in alignment with manifold 52 and female member 54 prior to the thermoforming operation. Thereafter, the sheet is secured between the manifold and female member 52, 54, respectively, by means of the mating engagement of locating pins 70, 72 with locating holes 60, 62 within female member 54. In this fashion the screen-printed graphic and plastic sheet are in alignment with manifold 52 and its related mold cavity 56 for the forming operation.

After clamping sheet 50 between manifold 52 and die 54, the temperature of face plate 92 is elevated to a predetermined temperature, which in the case of the appropriate sheet material is at least 335° F. but less than 480° F. Heat for manifold 52 is supplied through means of heat passage 130, and is monitored by means of a temperature probe disposed within a probe portal 136 defined within manifold 52. Plastic sheet 50 is elevated to the predetermined operating temperature, that is, approximately 350° F., which requires approximately two seconds, in view of the fact that the manifold is generally at an elevated temperature although not necessarily at the operating temperature.

A gas, generally air, is provided within passage 112 of manifold 52 after attainment of the operating temperature, and is applied at approximately 50 to 60 psi in the preferred embodiment. The gas is communicated through means of passage 112 and port 114 to recess 96 of manifold 52, and subsequently passes through passages 100 for communication to surface 102 of raised members 97, and thereby applies a force to move sheet material 50 into cavity 56 of female member 54. Simultaneously with the application of the elevated pressure within the manifold 52, a vacuum is developed within cavities 56 of die member 54 through means of passage 132 and ports 82, whereby the sheet 50 is formed under the stress or forming force of the elevated pressure within cavity 96 to the contour of cavity 56 defined within female member 54. This evacuation of cavity 56 allows free formation of the sheet material with limited resistance from elevated pressures within any of the cavities 56. The pressure level within manifold 52 is applied at approximately 50-60 psi, however, it is approximately 25 psi within each of the cavities 96, and the vacuum level within female mold cavities 56 is approximately 24 to 25 inches mercury depression from atmospheric pressure. The forming time of the button or structure being formed is on the order of ¼ sec. or less, and the elapsed time for the forming operation at an elevated temperature should be minimized so as to avoid excess temperature or formation which can lead to distortions within the ink surface including stretching, pitting or cavitation. The thermoforming operation is dependent upon time at a particular temperature and draw ratio, that is the ratio of the depth of the deepest point of the part versus the length of the draw. The operation should minimize the time that the sheet is disposed at the operating temperature versus the area versus the mass, in view of the fact that excess time at the particular temperature may distort the ink or graphic symbol. The specific operating parameters are, therefore, determined, by means of the operator so as to correlate to the operating characteristics of his equipment, the sheet material and the structure of the part.

The formed cap 20 is held within mold 54 for a short cooling time, approximately 2 seconds, prior to its removal from the die, which cooling period provides a self-annealing or stress-relieving operation so as to minimize retained or residual stresses within a deeply formed button, and thereby avoid cracks at the stretched areas of the sheet. Formed buttons 10 are transferred to a molding operation station, specifically an injection-molding operation station in the preferred embodiment, and light-pipe 16 is set in position within the illustrated button 10. Cap 20 and light-pipe 16 are cemented in position with respect to each other by means of the application of an injection-molded resin, which provides both stability and rigidity to the formed button. The molding resin is compatible with both the sheet material and the inks of the graphic display so as to avoid a significant differential in expansion and contraction coefficients, which could lead to separation and cracking during ambient temperature cycling of a button within a vehicle.

Light-pipe 16 in FIGS. 6-9 has an extension or pedestal 17 protruding from the base of cap 20, which pedestal is utilized to direct light from a source (not shown) to the graphic symbol. The light illuminates the symbol for viewing in the dark and the pedestal is also a structural member for mounting and securing button 10. In the specific illustrated embodiment, light-pipe 16 includes a pedestal stem projecting therefrom for contact with the specific application.

While only a specific embodiment of the invention has been described and shown, it is apparent that various alterations and modifications can be made therein. It is, therefore, the intention of the appended claims to cover all such modifications and alterations as may fall within the scope and spirit of the invention.

What is claimed is:

1. A backlit button produced within a thermoforming die comprising a female mold by performing the following sequence of method steps of:
   providing a sheet of thermoformable material having a first side and a second side;
   providing a graphic display upon one of said first and second sides of said thermoformable sheet;
   introducing said thermoformable sheet into said thermoforming die and securing said thermoformable sheet within said die such that said graphic display is disposed at a predetermined position within said die;
   preheating said thermoformable sheet;
   evacuating said female mold of said thermoforming die, toward which one side of said thermoformable sheet is disposed, so as to reduce the gas pressure therein and cause movement of said thermoformable sheet into said female mold of said die, and elevating the gas pressure upon the other opposite side of said thermoformable sheet so as to assist said movement of said thermoformable sheet into said female mold of said die and thereby cause formation of a thermoformed cap of said backlit button from said thermoformable sheet;
   retaining said thermoformed cap within said die until cooled;
   transferring said thermoformed cap into an injection molding apparatus;
   inserting a light pipe into said thermoformed cap; and
   injection molding a resin compound into said thermoformed cap and about said light pipe so as to integrally bond said light pipe and said thermoformed cap together;
   said thermoformed cap, said light pipe, and said resin compound comprising said backlit button.

2. A backlit button as set forth in claim 1, wherein:
said graphic display comprises a screen-printed graphic display.

3. A backlit button as set forth in claim 1, wherein:
said thermoformable sheet is preheated to a temperature which is within the range of 335° F.-480° F.

4. A backlit button as set forth in claim 1, wherein:
said thermoformable sheet comprises a polyester-polycarbonate polymer blend.

5. A backlit button as set forth in claim 4, wherein:
said graphic display comprises a screen-printed graphic display comprising an ink having a crosslink component which is adherent to and compatible with said polyester-polycarbonate sheet.

6. A backlit button as set forth in claim 1, wherein:

said pressure of said gas disposed upon said opposite side of said thermoformable sheet is at least 25 pounds per square inch.

7. A backlit button produced within a thermoforming die comprising a female mold by performing the following sequence of method steps of:

providing a sheet of thermoformable material having a first side and a second side;

providing a graphic display upon a portion of one of said first and second sides of said thermoformable sheet;

positioning and securing said thermoformable sheet within said thermoforming die such that said graphic display is disposed at a predetermined position within said thermoforming die;

heating said thermoformable sheet to a first temperature while maintaining said portion of said thermoformable sheet upon which said graphic display is disposed at a second temperature which is less than said first temperature so as to effectively heat insulate said portion of said thermoformable sheet upon which said graphic display is disposed and thereby prevent variation and distortion of said graphic display as a result of heating said thermoformable sheet to said first temperature;

evacuating siad female mold of said thermoforming die, toward which one side of said thermoformable sheet is disposed, so as to reduce the gas pressure within said female mold and cause movement of said thermoformable sheet into said female mold of said die, and elevating the gas pressure upon the other opposite side of said thermoformable sheet so as to assist said movement of said thermoformable sheet into said female mold of said die and thereby cause formation of a thermoformed cap of said backlit button from said thermoformable sheet;

retaining said thermoformed cap within said die until cooled;

transferring said thermoformed cap into an injection molding apparatus;

inserting a light pipe into said thermoformed cap; and injection molding a resin compound into said thermoformed cap and about said light pipe so as to secure said light pipe within said thermoformed cap, said thermoformed cap, said light pipe, and said resin compound comprising said backlit button.

8. A backlit button as set forth in claim 7, wherein: said graphic display comprises a screen-printed graphic display.

9. A backlit button as set forth in claim 7, wherein: said first temperature is within the range of 335°F.–480° F.

10. A backlit button as set forth in claim 7, wherein: said thermoformable sheet comprises a polyester-polycarbonate polymer blend.

11. A backlit button as set forth in claim 10, wherein: said graphic display comprises a screen-printed graphic display comprising an ink having a crosslink component which is adherent to and compatible with said polyester-polycarbonate sheet.

12. A backlit button as set forth in claim 7, wherein: said pressure of said gas disposed upon said opposite side of said thermoformable sheet is at least 25 pounds per square inch.

13. A backlit button produced within a thermoforming die comprising a female mold by performing the following sequence of method steps of:

providing a sheet of thermoformable material having a first side and a second side;

providing a graphic display upon one of said first and second sides of said thermoformable sheet;

introducing said thermoformable sheet into said thermoforming die and securing said thermoformable sheet within said die such that said graphic display is disposed at a predetermined position within said die;

preheating said thermoformable sheet;

evacuating said female mold of said thermoforming die, toward which one side of said thermoformable sheet is disposed, so as to reduce the gas pressure therein and cause movement of said thermoformable sheet into said female mold of said die, and elevating the gas pressure upon the other opposite side of said thermoformable sheet so as to assist said movement of said thermoformable sheet into said female mold of said die and thereby cause formation of a thermoformed cap of said backlit button from said thermoformable sheet;

retaining said thermoformed cap within said die until cooled;

transferring said thermoformed cap into an injection molding apparatus; and injection molding a resin compound into said thermoformed cap so as to define a longitudinal light passageway, within said molded resin and therefore within said thermoformed cap, which is linear along its longitudinal extent and which is axially aligned with said graphic display of said thermoformed cap so as to conduct light from a light source to said graphic display and thereby illuminate said graphic display, said thermoformed cap, said light passageway, and said resin compound comprising said backlit button.

14. A backlit button produced within a thermoforming die comprising a female mold by performing the following sequence of method steps of:

providing a sheet of thermoformable material having a first side and a second side;

providing a graphic display upon a portion of one of said first and second sides of said thermoformable sheet;

positioning and securing said thermoformable sheet within said thermoforming die such that said graphic display is disposed at a predetermined position within said thermoforming die;

heating said thermoformable sheet to a first temperature while maintaining said portion of said thermoformable sheet upon which said graphic display is disposed at a second temperature which is less than said first temperature so as to effectively heat insulate said portion of said thermoformable sheet upon which said graphic display is disposed and thereby prevent variation and distortion of said graphic display as a result of heating said thermoformable sheet to said first temperature;

evacuating said female mold of said thermoforming die, toward which one side of said thermoformable sheet is disposed, so as to reduce the gas pressure within said female mold and cause movement of said thermoformable sheet into said female mold of said die, and elevating the gas pressure upon the other opposite side of said thermoformable sheet so as to assist said movement of said thermoformable sheet into said female mold of said die and thereby cause formation of a thermoformed cap of said backlit button from said thermoformable sheet;

retaining said thermoformed cap within said die until cooled;

transferring said thermoformed cap into an injection molding apparatus; and injection molding a resin compound into said thermoformed cap so as to define a light passageway within said thermoformed cap which is axially aligned with said graphic display of said thermoformed cap so as to conduct light from a light source to said graphic display and thereby illuminate said graphic display, said thermoformed cap, said light passageway, and said resin compound comprising said backlit button.

15. A backlit button, to be produced within a thermoforming die comprising a female mold, comprising:

a sheet of thermoformable material which is capable of being heated within said thermoforming die and which has a first side and a second side wherein one of said first and second sides is disposed within said thermoforming die so as to be subjected to a gas having a first pressure while a second one of said first and second sides is disposed within said thermoforming die so as to be subjected to a second reduced gas pressure so as to cause movement of said thermoformable sheet material into said female mold of said thermoforming die and thereby cause formation of a thermoformed cap within said female mold of said thermoforming die;

a graphic display disposed at a predetermined position upon one side of said thermoformable sheet so as to be disposed at a predetermined position upon said thermoformed cap when said thermoformable sheet is formed into said thermoformed cap within said female mold of said thermoforming die;

a light pipe disposed within said thermoformed cap so as to be axially aligned with said graphic display portion of said thermoformed cap so as to conduct light from a light source to said graphic display portion of said thermoformed cap and thereby illuminate said graphic display portion of said thermoformed cap; and resin compound material injection molded within said thermoformed cap and about said light pipe disposed within said thermoformed cap for integrally bonding said light pipe and said thermoformed cap together, said thermoformed cap, said light pipe, and said resin compound material comprising said backlit button.

16. A backlit button as set forth in claim 15, wherein: said graphic display comprises a screen-printed graphic display.

17. A backlit button as set forth in claim 15, wherein: said thermoformable sheet material is heated to a temperature which is within the range of 335° F.–480° F.

18. A backlit button as set forth in claim 15, wherein: said thermoformable sheet material comprises a polyester-polycarbonate polymer blend.

19. A backlit button as set forth in claim 18, wherein: said graphic display comprises a screen-printed graphic display comprising an ink having a cross-linked component which is adherent to and compatible with said polyester-polycarbonate sheet.

20. A backlit button as set forth in claim 15, wherein: said first pressure of said gas disposed upon said one of said first and second sides of said thermoformable sheet is at least 25 pounds per square inch.

21. A backlit button, to be produced within a thermoforming die comprising a female mold, comprising:

a sheet of thermoformable material which is capable of being heated to a first temperature within said thermoforming die and which has a first side and a second side wherein one of said first and second sides is disposed within said thermoforming die so as to be subjected to a gas having a first pressure while a second one of said first and second sides is disposed within said thermoforming die so as to be subjected to a second reduced gas pressure so as to cause movement of said thermoformable sheet material into said female mold of said thermoforming die and thereby cause formation of a thermoformed cap within said female mold of said thermoforming die;

a graphic display disposed at a predetermined position upon one side of said thermoformable sheet so as to be disposed at a predetermined position upon said thermoformed cap when said thermoformable sheet is formed into said thermoformed cap within said female mold of said thermoforming die such that said graphic display is subjected to a second temperature within said thermoforming die which is less than said first temperature to which said thermoformable sheet is heated within said thermoforming die so as to effectively heat insulate said graphic display portion of said thermoformable sheet and thereby prevent variation and distortion of said graphic display as a result of said heating of said thermoformable sheet to said first temperature within said thermoforming die;

a light pipe disposed within said thermoformed cap so as to be axially aligned with said graphic display portion of said thermoformed cap so as to conduct light from a light source to said graphic display portion of said thermoformed cap and thereby illuminate said graphic display portion of said thermoformed cap; and resin compound material injection molded within said thermoformed cap and about said light pipe disposed within said thermoformed cap for securing said light pipe within said thermoformed cap, said thermoformed cap, said light pipe, and said resin compound material comprising said backlit button.

22. A backlit button, to be produced within a thermoforming die comprising a female mold, comprising:

a sheet of thermoformable material which is capable of being heated within said thermoforming die and which has a first side and a second side wherein one of said first and second sides is disposed within said thermoforming die so as to be subjected to a gas having a first pressure while a second one of said first and second sides is disposed within said thermoforming die so as to be subjected to a second reduced gas pressure so as to cause movement of said thermoformable sheet material into said female mold of said thermoforming die and thereby cause formation of a thermoformed cap within said female mold of said thermoforming die;

a graphic display disposed at a predetermined position upon one side of said thermoformable sheet so as to be disposed at a predetermined position upon said thermoformed cap when said thermoformable sheet is formed into said thermoformed cap within said female mold of said thermoforming die; and resin compound material means disposed within said thermoformed cap for defining a longitudinal light passageway, within said resin compound material means and therefore within said thermoformed cap, which is linear along its longitudinal extent and which is axially aligned with said graphic display of said thermoformed cap so as to conduct light from a light source to said graphic display and thereby illuminate said graphic display, said thermoformed cap, said light passageway, and said resin compound material means comprising said backlit button.

23. A backlit button as set forth in claim 22, wherein:
said graphic display comprises a screen-printed graphic display.

24. A backlit button as set forth in claim 22, wherein:
said thermoformable sheet material is heated to a temperature which is within the range of 335° F.–480° F.

25. A backlit button as set forth in claim 22, wherein:
said thermoformable sheet material comprises a polyester-polycarbonate polymer blend.

26. A backlit button as set forth in claim 25, wherein:
said graphic display comprises a screen-printed graphic display comprising an ink having a cross-linked component which is adherent to and compatible with said polyester-polycarbonate sheet.

27. A backlit button as set forth in claim 22, wherein:
said first pressure of said gas disposed upon said one of said first and second sides of said thermoformable sheet is at least 25 pounds per square inch.

28. A backlit button, to be produced within a thermoforming die comprising a female mold, comprising:

a sheet of thermoformable material which is capable of being heated to a first temperature within said thermoforming die and which has a first side and a second side wherein one of said first and second sides is disposed within said thermoforming die so as to be subjected to a gas having a first pressure while a second one of said first and second sides is disposed within said thermoforming die so as to be subjected to a second reduced gas pressure so as to cause movement of said thermoformable sheet material into said female mold of said thermoforming die and thereby cause formation of a thermoformed cap within said female mold of said thermoforming die;

a graphic display disposed at a predetermined position upon one side of said thermoformable sheet so as to be disposed at a predetermined position upon said thermoformed cap when said thermoformable sheet is formed into said thermoformed cap within said female mold of said thermoforming die such that said graphic display is subjected to a second temperature within said thermoforming die which is less than said first temperature to which said thermoformable sheet is heated within said thermoforming die so as to effectively heat insulate said graphic display portion of said thermoformable sheet and thereby prevent variation and distortion of said graphic display as a result of said heating of said thermoformable sheet to said first temperature within said thermoforming die; and resin compound material means disposed within said thermoformed cap for defining a light passageway within said thermoformed cap which is axially aligned with said graphic display of said thermoformed cap so as to conduct light from a light source to said graphic display so as to illuminate said graphic display, said thermoformed cap, said light passageway, and said resin compound material means comprising said backlit button.

* * * * *